United States Patent
Najafi

(10) Patent No.: US 10,504,496 B1
(45) Date of Patent: Dec. 10, 2019

(54) MUSIC TEMPO ADJUSTMENT APPARATUS AND METHOD BASED ON GAIT ANALYSIS

(71) Applicant: Sensoplex Inc., Redwood City, CA (US)

(72) Inventor: Hamid Najafi, Los Altos Hills, CA (US)

(73) Assignee: SENSOPLEX, INC., Redwood City, CA (US)

( * ) Notice: Subject to any disclaimer, the term of this patent is extended or adjusted under 35 U.S.C. 154(b) by 0 days.

(21) Appl. No.: 16/391,713

(22) Filed: Apr. 23, 2019

(51) Int. Cl.
| | |
|---|---|
| *G10H 1/40* | (2006.01) |
| *G10H 1/00* | (2006.01) |
| *G06F 3/01* | (2006.01) |

(52) U.S. Cl.
CPC ........... *G10H 1/0008* (2013.01); *G06F 3/011* (2013.01); *G06F 3/017* (2013.01); *G10H 2210/381* (2013.01); *G10H 2220/201* (2013.01)

(58) Field of Classification Search
CPC .... G06F 19/3481; G06F 3/16; G06F 16/4387; G16B 20/00; G10H 1/40
See application file for complete search history.

(56) References Cited

U.S. PATENT DOCUMENTS

| | | | |
|---|---|---|---|
| 3,746,743 A | 7/1973 | Mehta et al. | |
| 6,045,513 A | 4/2000 | Stone et al. | |
| 2001/0018564 A1 | 8/2001 | Manor et al. | |
| 2003/0171711 A1 | 9/2003 | Rohr et al. | |
| 2007/0113725 A1* | 5/2007 | Oliver | A61B 5/02438 84/612 |
| 2007/0113726 A1* | 5/2007 | Oliver | A61B 5/0006 84/615 |
| 2007/0118043 A1* | 5/2007 | Oliver | A61B 5/0245 600/519 |
| 2007/0180979 A1* | 8/2007 | Rosenberg | G02B 27/017 84/611 |
| 2007/0250134 A1 | 10/2007 | Miesel et al. | |
| 2008/0215101 A1 | 9/2008 | Schiff et al. | |
| 2010/0094377 A1 | 4/2010 | Graupe | |
| 2011/0046687 A1* | 2/2011 | Naschberger | A61H 23/00 607/3 |
| 2011/0060421 A1 | 3/2011 | Arabian et al. | |
| 2011/0118698 A1 | 5/2011 | Eckhoff et al. | |
| 2012/0143351 A1 | 6/2012 | Tompkins | |
| 2012/0150086 A1 | 6/2012 | Cohen | |
| 2013/0023798 A1 | 1/2013 | Greene et al. | |

(Continued)

OTHER PUBLICATIONS

"U.S. Appl. No. 16/385,315, Non Final Action with Restriction Requirement dated Jun. 13, 2019", 21 pgs.

(Continued)

*Primary Examiner* — Marlon T Fletcher
(74) *Attorney, Agent, or Firm* — Schwegman Lundberg & Woessner, P.A.

(57) ABSTRACT

A system comprises one or more processors of a machine; a music player coupled to the one or more processors; and a memory storing instructions that, when executed by the one or more processors, cause the machine to perform operations. The operations comprise: electronically receiving a gait parameter; determining if the received gait parameter is less than a threshold; adjusting a music parameter if the received gait parameter is less than a threshold; and outputting the adjusted music with the music player.

17 Claims, 8 Drawing Sheets

(56) References Cited

U.S. PATENT DOCUMENTS

| | | | |
|---|---|---|---|
| 2013/0184843 A1* | 7/2013 | Ellis | A61B 5/1038 |
| | | | 700/94 |
| 2013/0204545 A1 | 8/2013 | Solinsky | |
| 2013/0319575 A1 | 12/2013 | Mendyk | |
| 2014/0074062 A1 | 3/2014 | Caffey et al. | |
| 2014/0277241 A1 | 9/2014 | Bleich et al. | |
| 2014/0303460 A1 | 10/2014 | Corley et al. | |
| 2014/0303540 A1 | 10/2014 | Baym et al. | |
| 2015/0065082 A1 | 3/2015 | Sehgal | |
| 2015/0100251 A1 | 4/2015 | Solinsky | |
| 2016/0166180 A1 | 6/2016 | Martin | |
| 2016/0249829 A1 | 9/2016 | Trabia et al. | |
| 2016/0353246 A1 | 12/2016 | Elias et al. | |
| 2017/0055880 A1 | 3/2017 | Agrawal et al. | |
| 2017/0296116 A1* | 10/2017 | McCarthy | A61B 5/486 |
| 2019/0029914 A1 | 1/2019 | Polygerinos et al. | |

OTHER PUBLICATIONS

"U.S. Appl. No. 16/387,922, Non Final Action with Restriction Requirement dated Jun. 13, 2019", 18 pgs.

"DUOPA Full Prescribing Information", Smiths Medical ASD, Inc., (2015), 108 pgs.

"Medtronic DBS Therapy for Movement Disorders", Medtronic, Inc., (2017), 15 pgs.

"U.S. Appl. No. 16/385,315, Response Filed Jun. 28, 2019 to Non Final Office Action with Restriction Requirement dated Jun. 13, 2019", 8 pgs.

"U.S. Appl. No. 16/387,922, Response filed Jul. 19, 2019 to Non-Final Office Action dated Jun. 13, 2019", 8 pgs.

"U.S. Appl. No. 16/385,315, Final Office Action dated Aug. 15, 2019", 21 pgs.

"U.S. Appl. No. 16/387,922, Final Office Action dated Aug. 16, 2019", 21 pgs.

\* cited by examiner

MUSIC TEMPO ADJUSTMENT APPARATUS AND METHOD BASED ON GAIT ANALYSIS

TECHNICAL FIELD

An embodiment of the present subject matter relates generally to gait analysis and, more specifically, to music tempo adjustment based on gait analysis.

BACKGROUND

Falls are one of major causes of injury, disability, and death in populations over 65 years old. Research shows that certain gait parameters such as walking speed, stride length, leg asymmetry, stride time variability are indicators of the degree a person is prone to falls.

SUMMARY

A system comprises one or more processors of a machine; a music player coupled to the one or more processors; and a memory storing instructions that, when executed by the one or more processors, cause the machine to perform operations. The operations comprise: electronically receiving a gait parameter; determining if the received gait parameter is less than a threshold; adjusting a music parameter if the received gait parameter is less than a threshold; and outputting the adjusted music with the music player.

The operations may further comprise: receiving motion data from a gait monitoring device; and converting the motion data into the gait parameter. The motion data can include 3D accelerometer, gyroscope, and/or magnetometer data. The gait parameter may include speed, cadence, swing velocity, swing time and/or stride length, among others.

The music parameter can include tempo and the operations further comprise increasing the tempo until the received gait parameter exceeds the threshold.

The adjusting may include increasing time between some downbeats in a music bar and decreasing time between remaining downbeats so that overall tempo remains constant.

The operations may further comprise determining the threshold based on a height of a patient.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Figure 1:
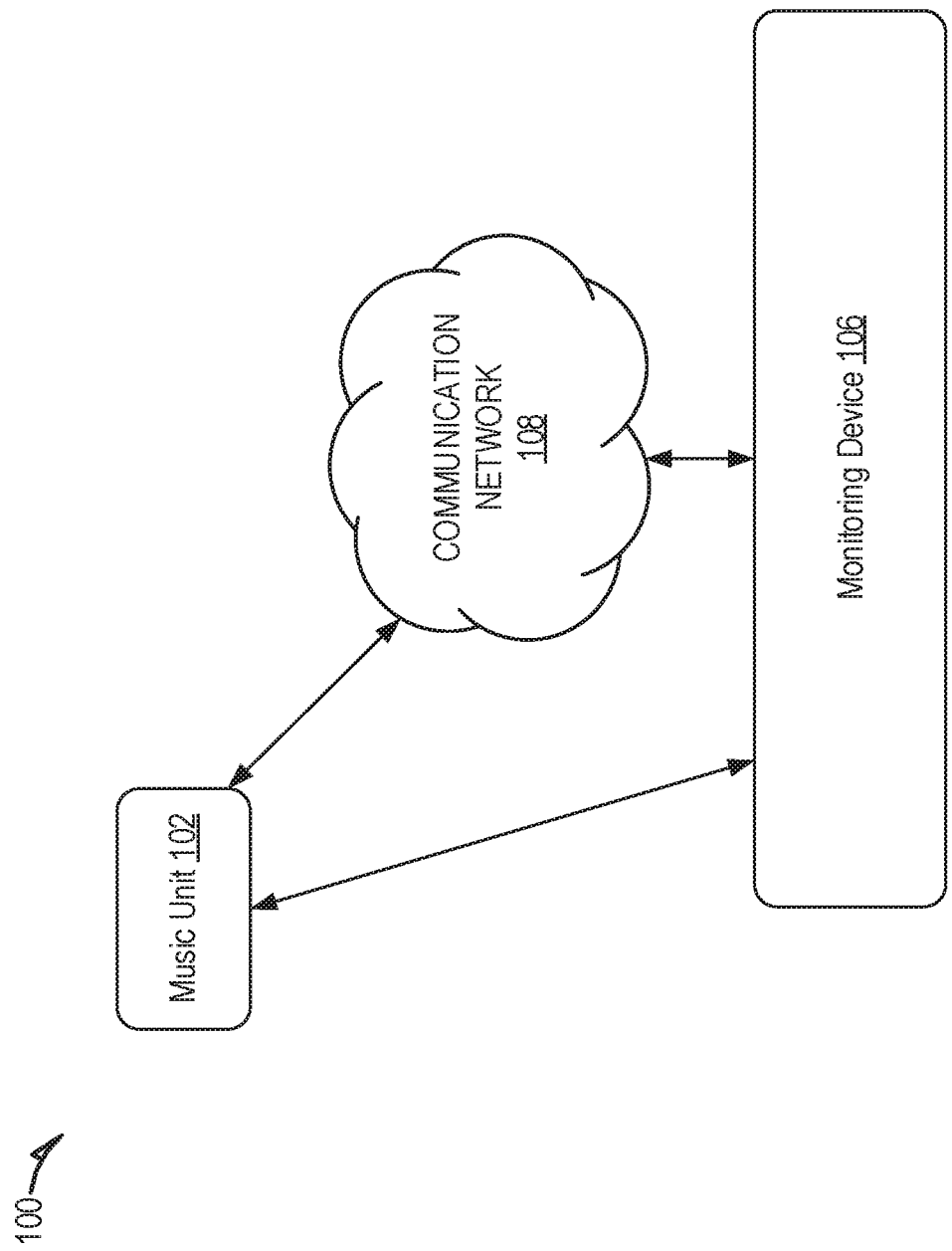
FIG. 1 shows an example system configuration, wherein electronic devices communicate directly or via a network for purposes of exchanging content and other data.

FIG. 1 shows an example system configuration 100, wherein electronic devices communicate via a network for purposes of exchanging content and other data. As shown, multiple devices (i.e., music unit 102, and monitoring device 106) are connected to a communication network 108 and configured to communicate with each other through use of the communication network 108. The communication network 108 is any type of network, including a local area network ("LAN"), such as an intranet, a wide area network ("WAN"), such as the internet, or any combination thereof. Further, the communication network 108 may be a public network, a private network, or a combination thereof. The communication network 108 is implemented using any number of communications links associated with one or more service providers, including one or more wired communication links, one or more wireless communication links, or any combination thereof. Additionally, the communication network 108 is configured to support the transmission of data formatted using any number of protocols. Alternatively, unit 102 and device 106 can communicate directly to each other via Bluetooth or other local protocol.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of the machine 800 shown in FIG. 8.

To facilitate communication with other computing devices, a computing device includes a communication interface configured to receive a communication, such as a request, data, etc., from another computing device in network communication with the computing device and pass the communication along to an appropriate component running on the computing device. The communication interface also sends a communication to another computing device in network communication with the computing device.

The unit 102 can comprise any device capable of outputting music, e.g., a smartphone, etc. The device 106 can comprise a gait analysis and activity monitoring device (GAAM) that continuously or frequently measures an activity level and gait parameters of a patient to determine the state of the patient's motor control and provide feedback to the unit 102 to adjust music parameters and output the adjusted music. The device 106 is strapped to the wrist, ankle, or other parts of the patient's body and sends the feedback data to the unit 102 through a short-range wireless link such as low energy Bluetooth or ANT.

One of the parameters known to indicate fall risk is gait speed or how fast a person walks. People with higher risk of fall tend to walk slower than normal. To help the user improve his/her walking speed the unit 102 first synchronizes the music to the walking beat of the user. Then gradually increases the tempo via sample rate conversion, time-domain harmonic sampling, time-scale modification, and/or other methods and waits until the user adjusts his/her tempo to the music. After that, the unit 102 increases the tempo further and the process is repeated until certain speed improvement is reached for that exercise period.

Another parameter known to correlate with the risk of fall is stride length. Shorter stride length is an indicator of higher fall risk. The unit 102 adjusts the time between the underlying beats of the music to the user stride time via sample rate conversion, time-domain harmonic sampling, time-scale modification, and/or other methods and then gradually increases this time between the beats while keeping the overall tempo the same. For instance, if the music has a waltz beat of ¾, the time between the first downbeat and the second downbeat is increased but the time between the second downbeat and the third are shortened the exact amount to keep the overall tempo of the music constant. This helps the user take longer steps and thereby increasing his/her swing time resulting in longer strides.

Similar adjustments are made to other music parameters such as consecutive bar timing to encourage leg symmetry and reduction of the variability of the gait pattern of the user.

Figure 2:
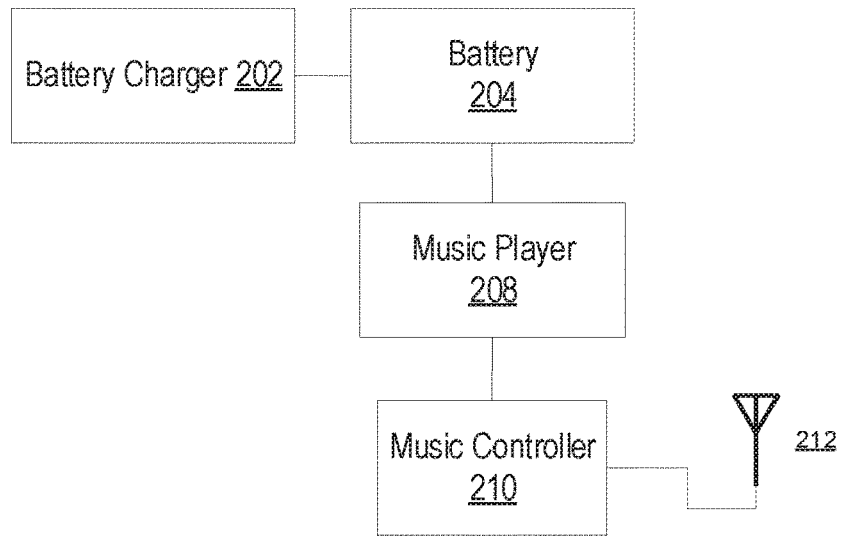
FIG. 2 is a block diagram of a music unit of the system, according to some example embodiments.

FIG. 2 is a block diagram of the music unit 102 of the system 100, according to some example embodiments. To avoid obscuring the inventive subject matter with unnecessary detail, various functional components (e.g., components) that are not germane to conveying an understanding of the inventive subject matter have been omitted from FIG. 2. However, a skilled artisan will readily recognize that various additional functional components may be supported by the system 102 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the unit 102 comprises a battery charger 202 connected to a battery 204, which powers a music player 208 connected to a controller 210. The controller 210 is connected to an I/O device 212, such as a radio transceiver and an antenna, to communicate with the device 106 and/or the network 108. The controller 210 controls the player 208 and can be a microprocessor-based circuit and software that communicates to the device 106 through a I/O 212 that talks to the device 106 through a short-range radio link or via a network. The Battery charger 202 charges the battery 204 when connected to an external power source. The player 208 can output music via a speaker and/or headphones, etc.

Figure 3:
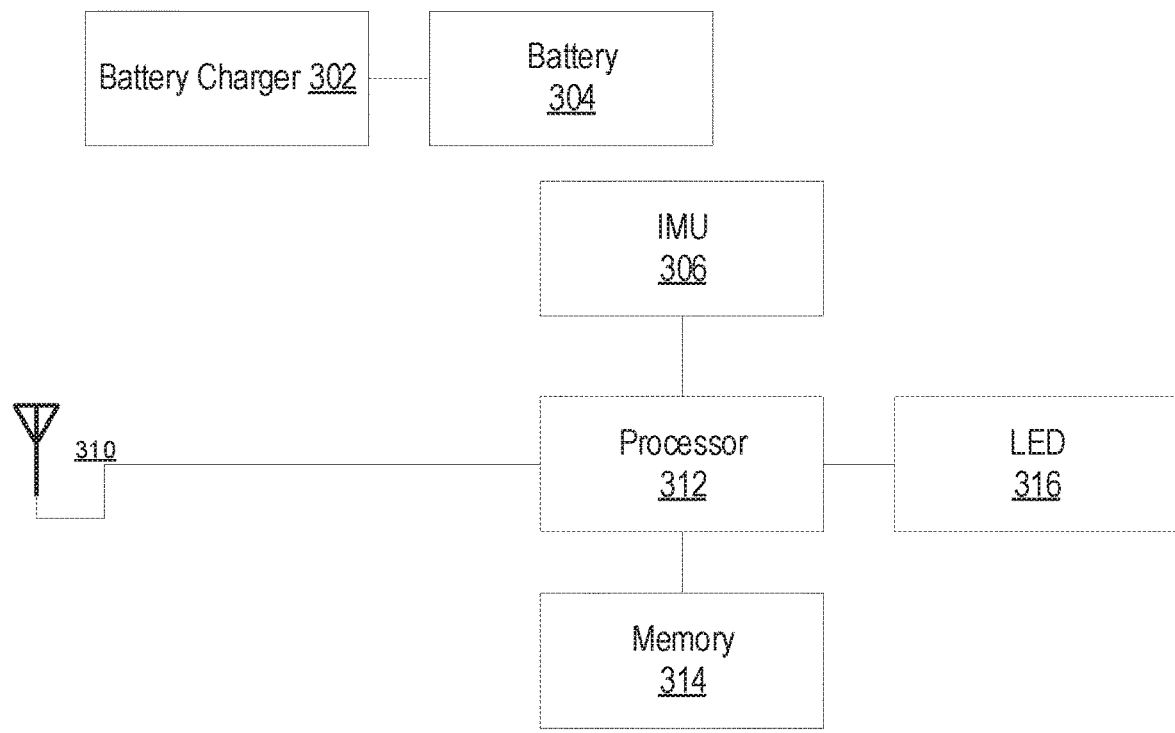
FIG. 3 is a block diagram of a monitoring device of the system, according to some example embodiments.

FIG. 3 is a block diagram of a monitoring device 106 of the system 100, according to some example embodiments. The device 106 comprises an inertial measurement unit 306 coupled to a processor 312, which is coupled to memory 414 and I/O 310. The device 106 can also optionally include a display 316 (e.g., LED, LCD) to display on/off status, power levels and/or parameters discussed below.

During operation, the I/O 310, which may include an antenna, communicates with the unit 102 and provides gait and ambulation data to the controller 210. Inertial Measurement Unit (IMU) 306 comprises motion sensors such as accelerometer, gyroscope, GPS and/or magnetometer that detect patient motions and provide the data to the processor 312. The processor 312 receives raw motion data from IMU 306, processes the data and generates gait and/or ambulation parameters. Parameters can include stride length, speed, etc. These parameters are sent through I/O 310 to the unit 102. Battery charger 302 and battery 304 provide power to the device 106.

In an embodiment, the IMU 306 includes 3D magnetometers that can detect the 3D earth magnetic field surrounding the device. This is used to locate the device indoors within a house or business. Before the device can be used as such, a magnetic mapping software is used to map the 3D magnetic fields in the house or business and correlate that to a physical map of the house identifying places such as living room bathrooms, kitchen, etc. Then this mapping data is used by the application processor to correlate the 3D magnetic data it receives from the magnetometers and determines the approximate location of the wearable and the person wearing the device as well as raw motion data that can be used to generate the above-mentioned parameters.

Figure 4:
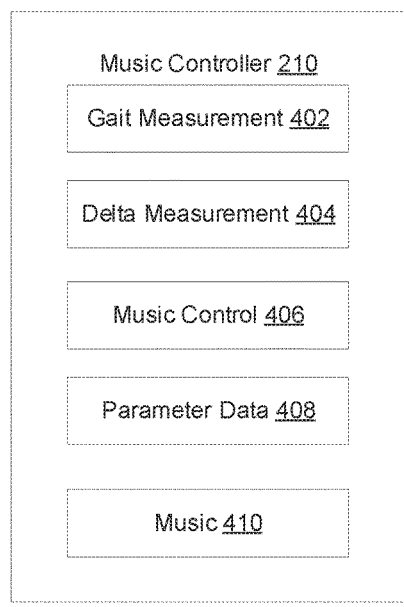
FIG. 4 is a block diagram of a controller of the music unit, according to some example embodiments.

FIG. 4 is a block diagram of the music controller 210 of the unit 102, according to some example embodiments. The controller 210 includes a gait measurement module 402, a delta measurement module 404, a music control module 406, parameter data 408 and music 410. During operation of the controller 210, if the monitoring device 106 transmits raw motion data, the module 402 will calculate gait parameters such as stride (length), varying strides, and speed. Alternatively, the device 106 processes raw motion data and sends the gait parameters to the unit 102.

The delta measurement module 404 determines if the calculated gait parameter (s) of the user of the monitoring device 106 is below a desired threshold. For example, inconsistent strides, small strides, low speed, etc. The module 404 can compare the parameters with parameters stored in parameter data 408. Stored parameters will indicate expected parameters based on gender, age and/or height. For example, taller people will have longer strides than shorter people. Alternatively or in addition, stored parameters can include historical data of the patient. For example, a base stride of a patient may be different than an expected stride based on gender, height, age, etc.

The music control 406 then causes the music player 208 adjust music parameters. First, the control 406 synchronizes outputted music from a music file 410 to match a walking beat (or cadence) indicated by the gait parameter(s). If the delta measurement module 404 determines that a user is not meeting minimum parameters in the parameter data 408, the music control can continually adjust (e.g., increase) tempo of the music until the delta measurement module 404 determines that parameters in the parameter data 408 are met.

In another example embodiment, the music control 406 adjusts the time between the underlying beats of the music to the user stride time and then gradually increases this time between the beats while keeping the overall tempo the same. For instance, if the music has a waltz beat of 3%, the time between the first downbeat and the second downbeat is increased but the time between the second downbeat and the third are shortened the exact amount to keep the overall tempo of the music constant. This helps the user take longer steps and thereby increase his/her swing time resulting in longer strides.

Similar adjustments are made to other music parameters such as consecutive bar timing to encourage leg symmetry and reduction of the variability of the gait pattern of the user.

Figure 5:
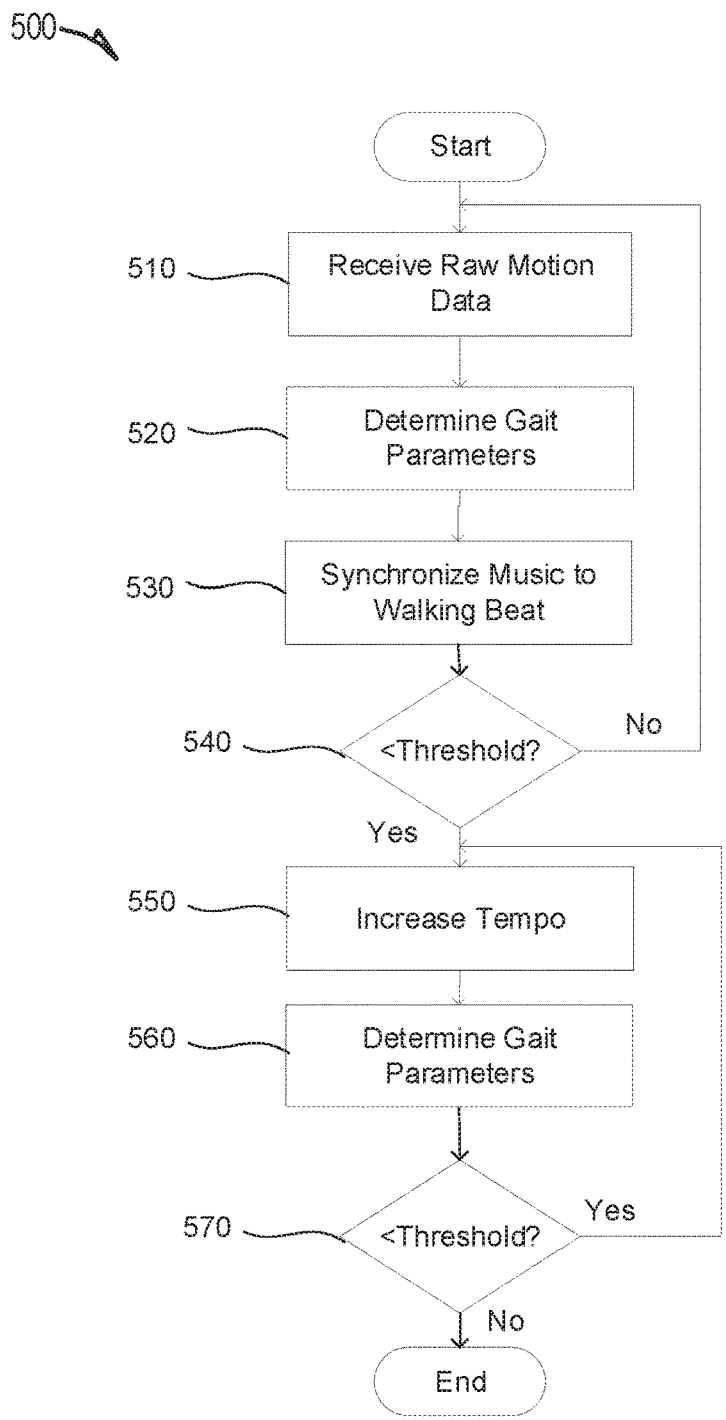
FIG. 5 is a flowchart illustrating a method of adjusting music tempo, according to some example embodiments.

FIG. 5 is a flowchart illustrating a method 500 of adjusting music tempo, according to some example embodiments. The IMU 306 generates raw motion data and transmits same to the unit 102, where it is received (510). Gait parameters are then determined (520) by the gait measurement module 402 in the unit 102. Alternatively, the processor 312 can receive the raw data from the IMU 306 and calculate the parameters and transmit the calculated parameters to the controller 210 of the unit 102.

The music control 406 then synchronizes (520) music to a walking beat of a user based on the determined parameters. The delta measurement module 404 then determines if the parameter(s) is less than (540) a threshold based on historical data for the patient and/or stored parameters in the data 408, which can be based on height, gender, age, etc. of the patient. If parameter(s) exceed a threshold (e.g., stride and/or speed meet minimum levels), then the method 500 returns to receiving (510) and continuously repeats until the parameters fall below a threshold (e.g., speed or stride are lower than stored parameters). Otherwise, the music control increases (550) the music tempo and gait parameters then determined (560) again. If still less than the threshold (570), then the method returns to increasing (550) and repeats until the threshold (570) is reached. The method 500 then ends once the threshold is reached.

Figure 6:
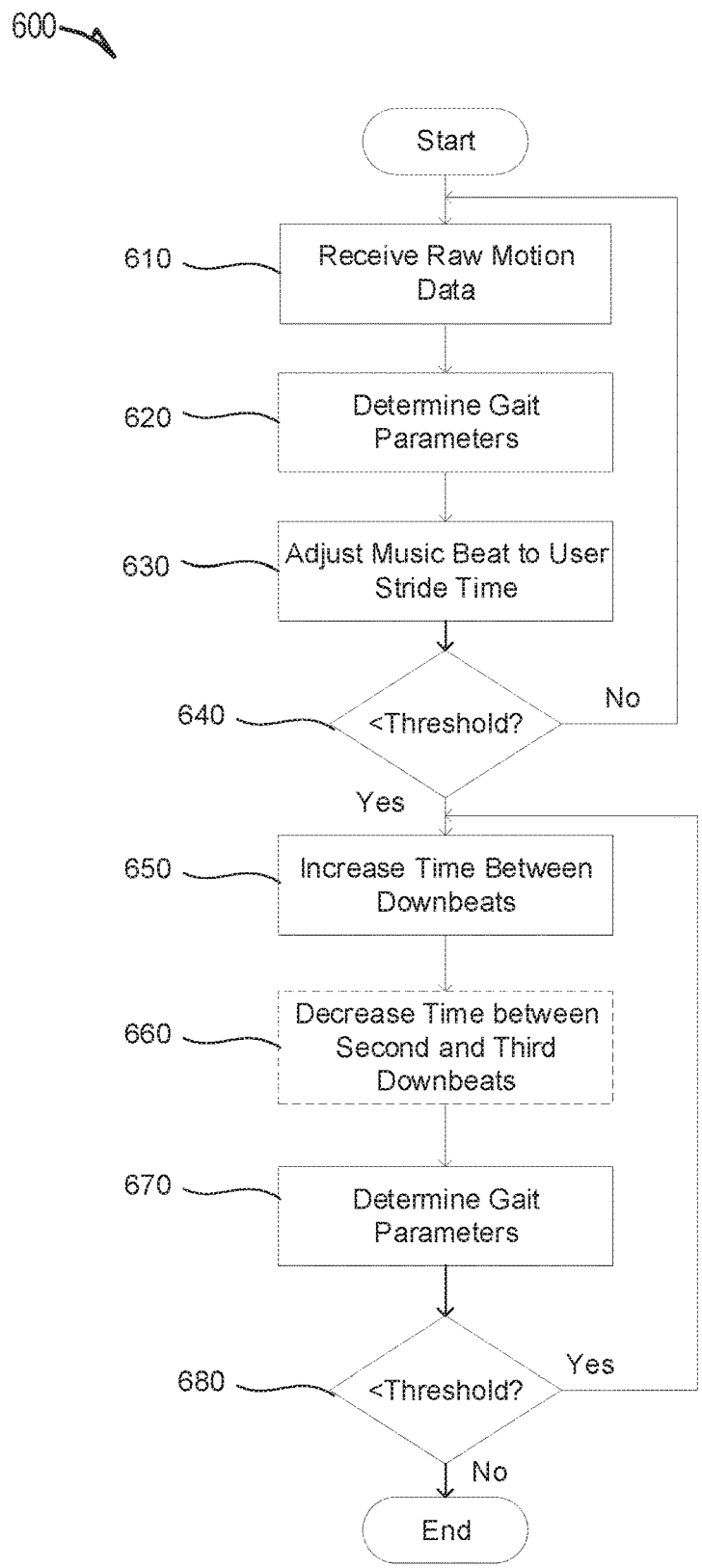
FIG. 6 is a flowchart illustrating a method of adjusting time between underlying beats of music, according to some example embodiments.

FIG. 6 is a flowchart illustrating a method 600 of adjusting time between downbeats of music, according to some example embodiments. The IMU 306 generates raw motion data and transmits same to the unit 102, where it is received (610). Gait parameters are then determined (620) by the gait measurement module 402 in the unit 102. Alternatively, the processor 312 can receive the raw data from the IMU 306 and calculate the parameters and transmit the calculated parameters to the controller 210 of the unit 102.

The music control 406 then adjusts (630) music beat to a walking stride time of a user based on the determined parameters. The delta measurement module 404 then determines if the parameter(s) is less than (540) a threshold based on historical data for the patient and/or stored parameters in the data 408, which can be based on height, gender, age, etc. of the patient. If parameter(s) exceed a threshold (e.g., stride and/or speed meet minimum levels), then the method 600 returns to receiving (610) and continuously repeats until the parameters fall below a threshold (e.g., speed or stride are lower than stored parameters). Otherwise, the music control 406 increases (650) time between downbeats in music. Optionally, the control 406 may also decrease time between second and third downbeats so that overall music tempo remains substantially constant. Gait parameters are then determined (670) again. If still less than the threshold (680), then the method returns to increasing (650) and repeats until the threshold (680) is reached. The method 600 then ends once the threshold is reached.

Software Architecture

Figure 7:
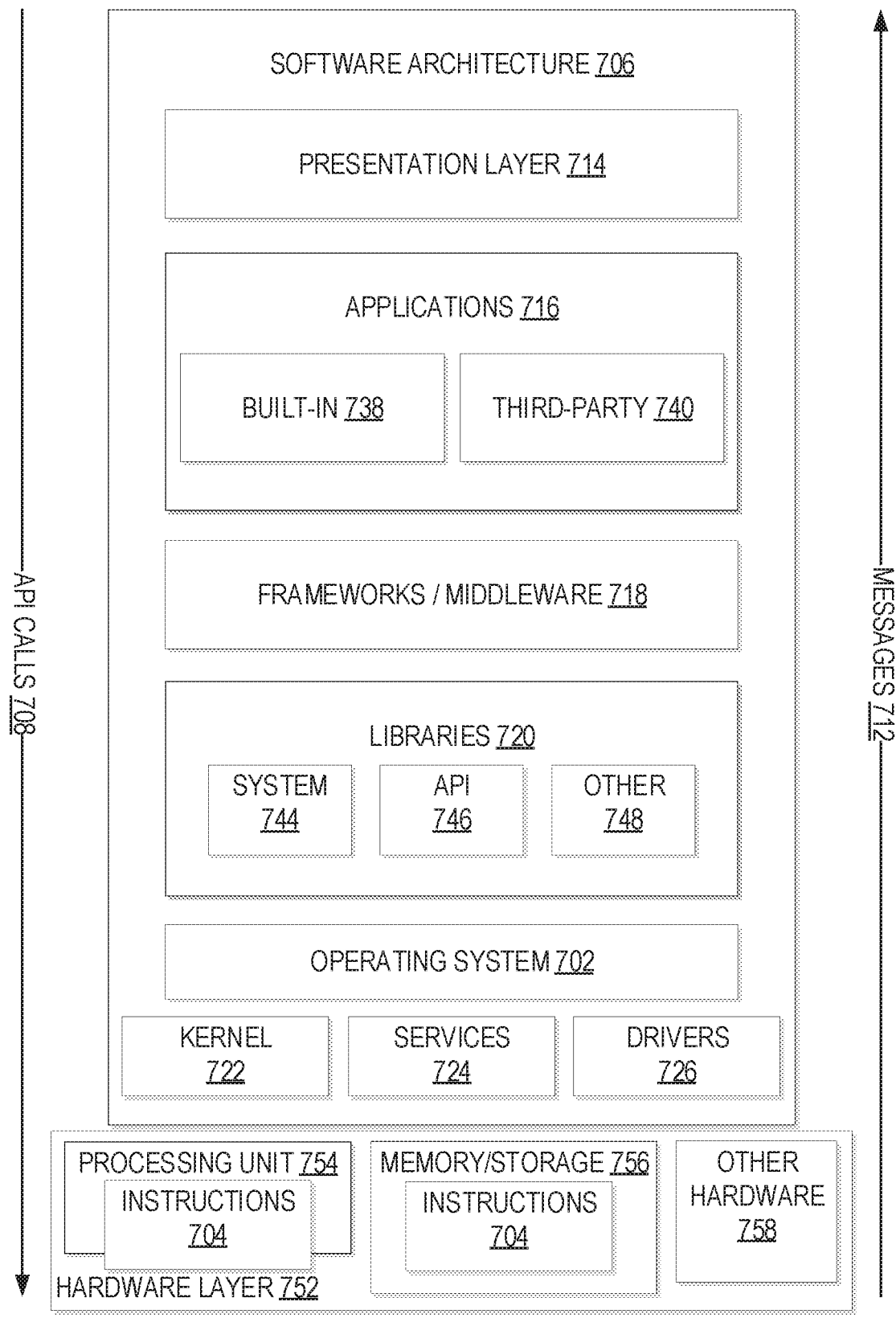
FIG. 7 is a block diagram illustrating a representative software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules memory/storage 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724 and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 616 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724 and/or drivers 726), libraries 720, and frameworks/middleware 718 to create user interfaces to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
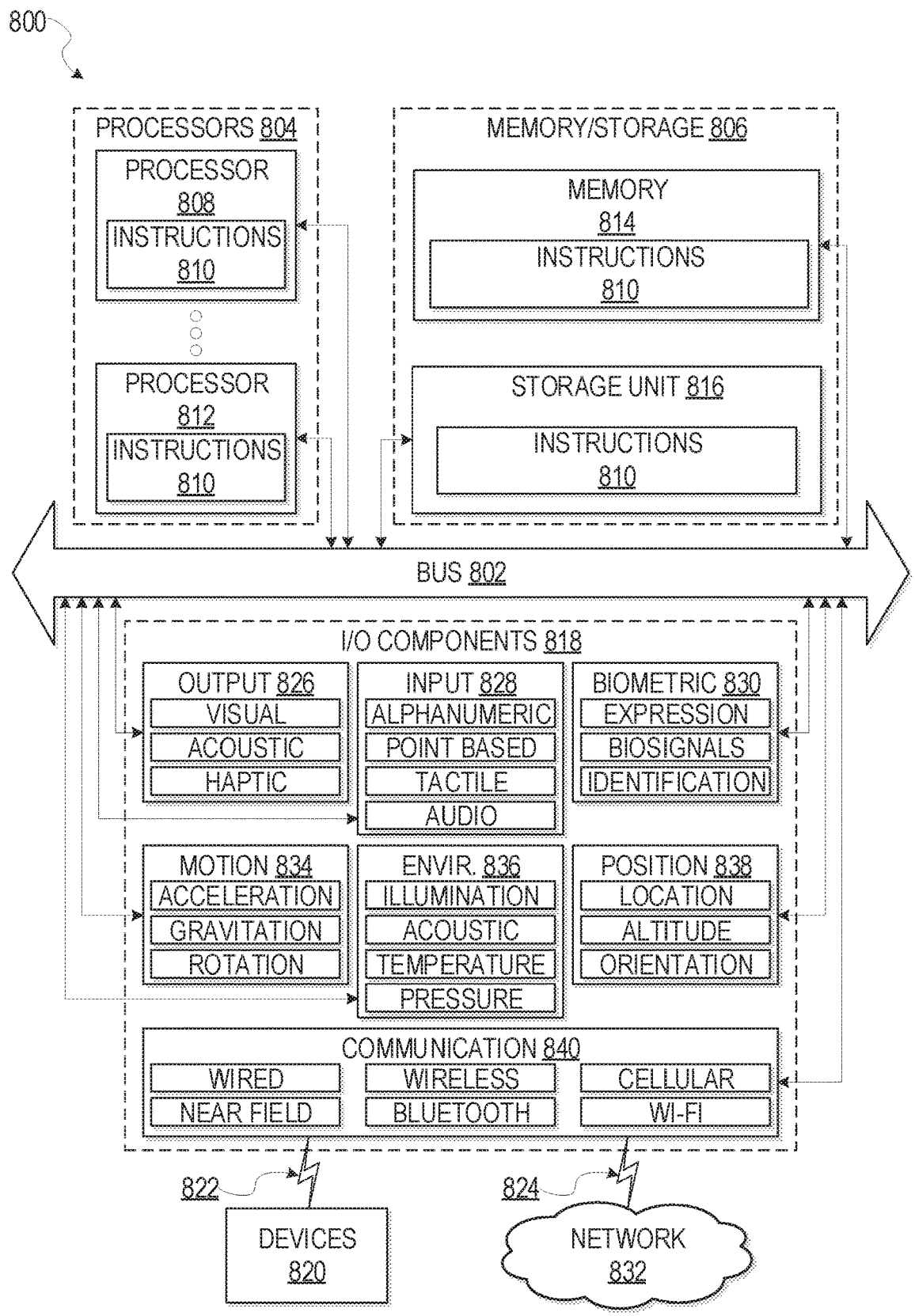
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 700 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 700, and includes digital or analog communications signals or other intangible medium to facilitate communication of such instructions 810. Instructions 710 may be transmitted or received over the network 832 using a transmission medium via a network interface device and using any one of a number of well-known transfer protocols.

"DEVICE" in this context refers to any machine 800 that interfaces to a communications network 732 to obtain resources from one or more server systems or other client devices. A device 102, 106 may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 804 (sometimes referred to as "cores") that may execute instructions 810 contemporaneously.

What is claimed is:

1. A machine-implemented method, comprising:
   electronically receiving a gait parameter;
   determining if the received gait parameter is less than a threshold;
   adjusting a music parameter if the received gait parameter is less than a threshold; and
   outputting the adjusted music;
   wherein the gait parameter includes stride length;
   wherein the adjusting includes increasing time between some downbeats of a music bar.

2. The method of claim 1, further comprising:
   receiving motion data from a gait monitoring device; and
   converting the motion data into the gait parameter.

3. The method of claim 2, wherein the motion data include 3D magnetic data.

4. The method of claim 1, wherein the gait parameter includes speed.

5. The method of claim 4, wherein the music parameter includes tempo.

6. The method of claim 5, further comprising increasing the tempo until the received gait parameter exceeds the threshold.

7. The method of claim 1, wherein the adjusting further includes decreasing time between remaining downbeats of the music bar so that overall tempo remains constant.

8. The method of claim 1, further comprising determining the threshold based on a height of a patient.

9. A machine-readable storage device embodying instructions that, when executed by a machine, cause the machine to perform operations comprising:
   electronically receiving a gait parameter;
   determining if the received gait parameter is less than a threshold;
   adjusting a music parameter if the received gait parameter is less than a threshold; and
   outputting the adjusted music;
   wherein the gait parameter includes stride length;
   wherein the adjusting includes increasing time between some downbeats.

10. A system, comprising:
    one or more processors of a machine;
    a music player coupled to the one or more processors; and
    a memory storing instructions that, when executed by the one or more processors, cause the machine to perform operations comprising:
    electronically receiving a gait parameter;
    determining if the received gait parameter is less than a threshold;
    adjusting a music parameter if the received gait parameter is less than a threshold; and
    outputting the adjusted music with the music player;
    wherein the gait parameter includes stride length;
    wherein the adjusting includes increasing time between some downbeats.

11. The system of claim 10, wherein the operations further comprise:
    receiving motion data from a gait monitoring device; and
    converting the motion data into the gait parameter.

12. The system of claim 11, wherein the motion data include 3D magnetic data.

13. The system of claim 10, wherein the gait parameter includes speed.

14. The system of claim 13, wherein the music parameter includes tempo.

15. The system of claim 14, wherein the operations further comprise increasing the tempo until the received gait parameter exceeds the threshold.

16. The system of claim 10, wherein the adjusting further includes decreasing time between a remainder of the downbeats in a music bar so that overall tempo remains constant.

17. The system of claim 10, wherein the operations further comprise determining the threshold based on a height of a patient.

* * * * *